United States Patent
Tschantz et al.

(10) Patent No.: US 8,328,048 B2
(45) Date of Patent: Dec. 11, 2012

(54) PACKAGE WITH RESEALABLE FLEXIBLE SPOUT

(75) Inventors: Michell C. Tschantz, Newtown, CT (US); Kerry M. McKinley, Newtown, CT (US)

(73) Assignee: IPI, Inc., Sandy Hook, CT (US)

( * ) Notice: Subject to any disclaimer, the term of this patent is extended or adjusted under 35 U.S.C. 154(b) by 405 days.

(21) Appl. No.: 12/590,599

(22) Filed: Nov. 10, 2009

(65) Prior Publication Data

US 2010/0187254 A1    Jul. 29, 2010

Related U.S. Application Data

(60) Provisional application No. 61/198,824, filed on Nov. 10, 2008.

(51) Int. Cl.
| | |
|---|---|
| *B65D 35/56* | (2006.01) |
| *B65D 33/16* | (2006.01) |
| *B65D 3/00* | (2006.01) |

(52) U.S. Cl. .......... 222/105; 222/183; 222/527; 383/63; 383/906; 229/117.27

(58) Field of Classification Search .................. 222/105, 222/93, 183, 527, 530, 526; 383/63, 61.2, 383/203, 204, 906, 3; 229/117.3, 117.27
See application file for complete search history.

(56) References Cited

U.S. PATENT DOCUMENTS

| | | | |
|---|---|---|---|
| 172,039 | A | 1/1876 | Lazarevitch |
| 3,746,215 | A | 7/1973 | Ausnit et al. |
| 4,196,030 | A | 4/1980 | Ausnit |
| 4,296,502 | A | 10/1981 | Bortle |
| 6,527,444 | B1 | 3/2003 | Buchman |
| 6,783,276 | B2 | 8/2004 | Machacek et al. |
| 7,004,630 | B2 | 2/2006 | Piechocki et al. |
| 7,097,092 | B1 | 8/2006 | Marrale |
| 2005/0036720 | A1 | 2/2005 | Olin |
| 2007/0230834 | A1 | 10/2007 | Schneider |

*Primary Examiner* — Kevin P Shaver
*Assistant Examiner* — Stephanie E Williams
(74) *Attorney, Agent, or Firm* — Ware, Fressola, Van Der Sluys & Adolphson LLP

(57) ABSTRACT

A package for containing and dispensing of pourable product has a sheet material bag. A dispenser tube is inserted through a seam of the bag, where a pouring spout of the tube extends into the bag from the bag seam and a sealing sleeve extends outwardly from the bag seam. An openable/closeable seal extends across the end of the sealing sleeve, the openable/closeable seal having first and second strips with releasably interengaging configuration. The openable/closeable seal may be opened and the pouring spout everted through the sealing sleeve. The pouring spout is longer than the sealing sleeve and extends past the open seal. The openable/closeable seal is a zipper seal or a slide seal. The package may have a box in which the bag and dispenser tube are contained prior to and after use in dispensing a pourable product.

5 Claims, 2 Drawing Sheets

PACKAGE WITH RESEALABLE FLEXIBLE SPOUT

CROSS REFERENCE TO RELATED APPLICATIONS

This application claims priority to U.S. provisional application Ser. No. 61/198,824 filed on Nov. 10, 2008, which is incorporated herein by reference.

TECHNICAL FIELD

The invention herein relates to packaging for pourable goods, the package having a resealable, flexible spout.

BACKGROUND OF INVENTION

Many pourable products are used a portion at a time, and it is desirable to maintain remaining portions fresh for future use. Such products include: flour, sugar, rice, cereal, potato chips, popcorn and pre-popped popcorn, and household products such as powdered soap, fertilizer and grass seed, as well as other products that are generally granular in nature and poured. The foregoing is by no means an exclusive list of pourable products, and the products may include any type of product generally packaged in a sealed bag, whether used from the bag itself or whether the bag is supported within a carton. Such products are sometimes packaged in a bag that may be crimped at the end and sometimes with a zipper seal integral with the full-width end of the bag.

When a product bag is provided with a zipper seal, the product can lodge in the seal and prevent a good seal on closure. When the product is in a bag supported within a box, e.g., cereal in a cereal box, the bag is generally torn or cut open, and it is somewhat difficult to pour the cereal from the bag in a controlled manner without losing some of the product to the interior of the box. No seal is provided once the bag has been opened.

Accordingly, it would be an important advance in the art to provide a package for pourable products that is resealable and facilitates pouring.

SUMMARY OF THE INVENTION

A principal object of the invention herein is to provide an improved package for pourable products.

Another object of the invention herein is to provide a package for pourable products that facilitates pouring of products in a controlled manner.

A further object of the invention herein is to provide a package for pourable products that is resealable to maintain freshness of the remaining product for future use.

In carrying out the invention herein, a bag is provided for containing a pourable product. A flexible dispenser tube is mounted through an opening in the bag, the dispenser tube having a sealing sleeve extending outwardly from the bag and an evertable pouring spout extending into the bag. The evertable pouring spout is longer than the sealing sleeve. A zipper seal is provided adjacent to the end of the sealing sleeve. When the zipper seal is opened, the pouring spout may be everted through the sealing sleeve to extend past the zipper seal, and the pourable product may be dispensed through the everted pouring spout. The pouring spout is returned to the bag and the zipper seal is closed for storage.

In an additional aspect of the invention, the bag and dispenser tube are thermoplastic polymers, and the dispenser tube is mounted in the bag by heat sealing it to the bag adjacent the bag opening. The dispenser tube may be sealed to the bag in a seam of the bag.

In another aspect of the invention, a box is provided surrounding the bag for supporting the bag and the pourable product therein between uses.

In a further aspect of the invention, the evertable pouring spout has a grip attached thereto, facilitating the eversion of the pouring spout through the sealing sleeve. The grip may be elongated to extend toward the zipper seal.

In a still further aspect of the invention, the sealing sleeve is initially permanently sealed between its distal end and the zipper seal, for prolonged storage of the pourable product before use.

Other and more specific objects and features of the invention herein will in part be apparent to those skilled in the art and will in part appear in the following detailed description and the claims, taken together with the drawings.

BRIEF DESCRIPTION OF DRAWINGS

The same reference numerals refer to the same elements throughout the various figures.

DETAILED DESCRIPTION OF INVENTION

Figure 1:
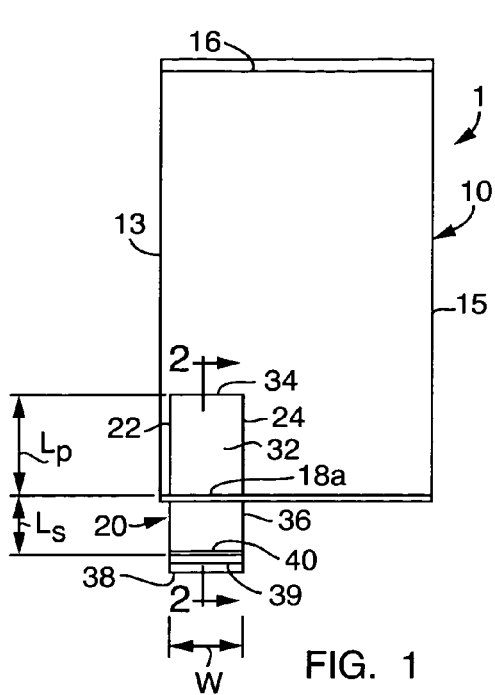
FIG. 1 is a plan view of a package for pourable products according to the invention herein.

With reference to FIGS. 1-4, a package 1 having a bag 10 and a dispenser tube 20 is shown. The bag 10 is preferably fabricated of thermoplastic polymer tube stock, such as polyester, polypropylene or polyethylene, or any other thermoplastic polymer selected for use with a particular product. It may also be other film materials known to the packaging art associated with the product. The tube stock forming bag 10 provides first and second sheets 12, 14 of the bag between side edges 13 and 15. The first and second sheets of the tube stock are secured together by end seams 16 and 18, with end seam 18 mounting the tube 20 as more fully described below. The end seam 16 may be formed after the product is inserted in the bag 10. It will be appreciated that the bag 10 may be formed of a single sheet folded onto itself, and that the end seams may be provided with various corner seam configurations which provide the bag in a desired shape, as is well known in the art.

Figure 2:
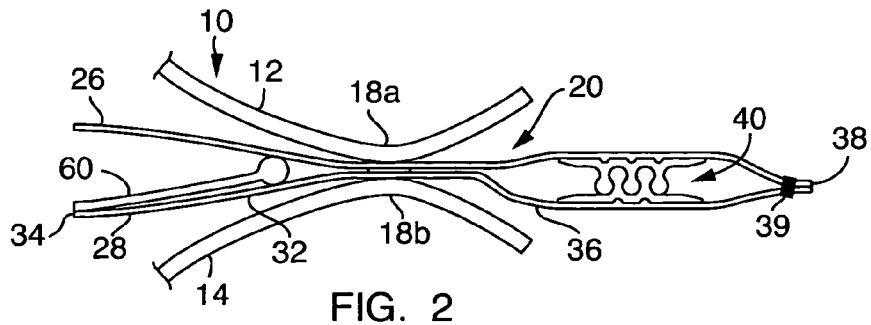
FIG. 2 is a fragmentary sectional view of the package of FIG. 1, taken along the lines 2-2 of FIG. 1.
Figure 3:
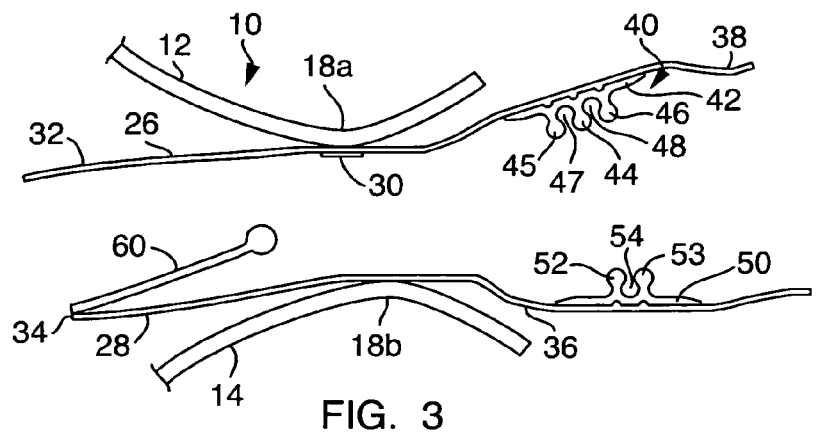
FIG. 3 is a fragmentary sectional view of the package of FIG. 1, also taken along the lines 2-2 of FIG. 1, and showing an open tube of the package.
Figure 4:
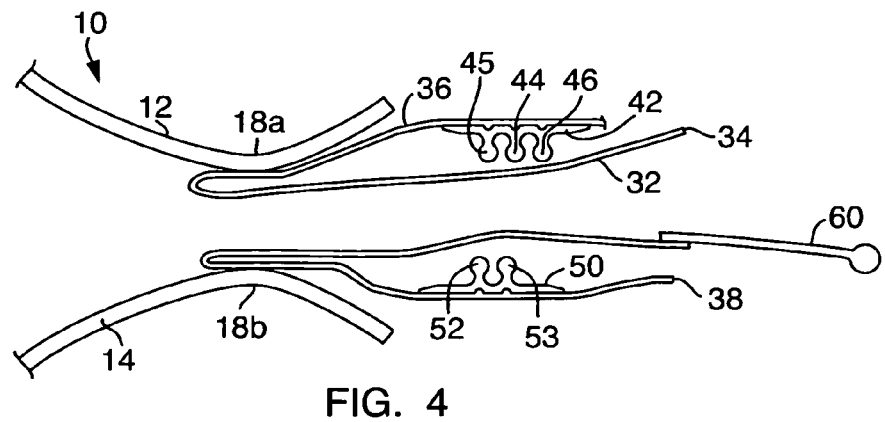
FIG. 4 is a fragmentary sectional view of the package of FIG. 1, shown with a pouring spout everted.

The dispenser tube 20 is also fabricated of polymer tube stock, initially in flattened form having folded side edges 22 and 24. The polymer of the dispenser tube 20 is compatible with the polymer of the bag 10 and may be other material compatible with the bag 10. The flattened configuration provides the dispenser tube 20 with a top layer 26 and a lower layer 28. As best seen in FIGS. 2-4, the seam 18 of the bag 10 has portions 18a and 18b crossing the dispenser tube 20 with the seam portion 18a securing the upper layer 26 to the upper sheet 12 of the bag 10 and the seam portion 18b securing the lower layer 28 to the lower sheet 14 of the bag 10. A heat-resistant strip 30 is provided on the inside of the upper layer 26 so that the layers 26 and 28 are not secured together as the seam portions 18a and 18b are heat-formed. The sheets 26 and 28 and the dispenser tube 20 may be secured together by other means, such as adhesives or other forms of bonding, in which case materials other than heat fusible polymers may be used. The dispenser tube 20 is preferably located at a corner of the bag 10, i.e., near one of the side edges 13, 15. Thus, the product can be poured from the bag 10 without accumulation in a corner thereof.

The dispenser tube 20 has a pouring spout 32 that extends from the seam 18 into the bag 10 to an end 34. The dispenser tube 20 has an exterior sealing sleeve 36 that extends outwardly from the seam 18 to an outside distal end 38. A zipper seal 40 or other openable/closeable seal is deployed across the exterior sealing sleeve 36, near the outside distal end 38. A heat seal seam 39 may be provided between the zipper seal 40 and the outside distal end 38, for permanently sealing the end 38 prior to use of the package 1. An incremental portion of the sealing sleeve 36 including the seam 39 may be cut away when the package 1 is ready for use, at which time the zipper seal 40 becomes the primary seal for the package 1.

The zipper seal 40 is deployed across the exterior sleeve portion 36 of dispenser tube 20, adjacent its exterior end 38. The zipper seal 40 has a first strip 42 on upper layer 26 of the dispenser tube 20, including at least one rib 44 that extends from the surface of the first strip 42, and a second strip 50 on lower layer 28 of the dispenser tube 20 opposite the first strip 42. The first and second strips 42 and 50 are preferably respectively integral with the first and second layers 26, 28 of the dispenser tube 20. The second strip 50 includes at least two ribs 52 and 53 that extend from the surface of the second strip 50 and define groove 54 therebetween, and ribs 52, 53 and are respectively offset from and flank the rib 44 of the first strip 42 such that the first and second strips 42, 50 may be sealingly interengaged by forcing rib 44 into groove 54. In the zipper seal 40 used herein, the first strip 42 has three ribs, 44, 45 and 46 defining grooves 47, 48, and the second strip 50 has two ribs 52 and 53 which flank the central rib 44 of strip 42. When the zipper seal 40 is closed as seen in FIG. 3, the two ribs 52, 53 respectively engage in grooves 47, 48 flanked by the ribs 44, 45, 46 of strip 42. Suitable zipper seals may be obtained from Com-Pac International, Inc. of Carbondale, Ill. Slider seals may also be used to provide a sliding closure member for the seal.

The end of the pouring spout 32 has a grip 60 to provide for easily grasping and pulling to evert the pouring sleeve, as shown in FIG. 4. The grip 60 is preferably elongated and extends toward or into the sealing sleeve 36, so it is accessible to be grasped.

In package 1, the dispenser tube 20 may have a flattened width of at least three to four inches and preferably five to six inches so that a user can reach in and grasp either the pouring spout 32 or the grip 60 attached thereto. Additionally, the pouring spout 32 may have a length $L_p$, of approximately three inches and the sealing sleeve 36 may have a length $L_s$ of approximately two inches. Thus, the pouring spout 32 is longer than the exterior sealing sleeve 36 so that the pouring spout 32 may be everted to cover the first and second strips 42, 50 of the zipper seal 40, as shown in FIG. 4.

Figure 5:
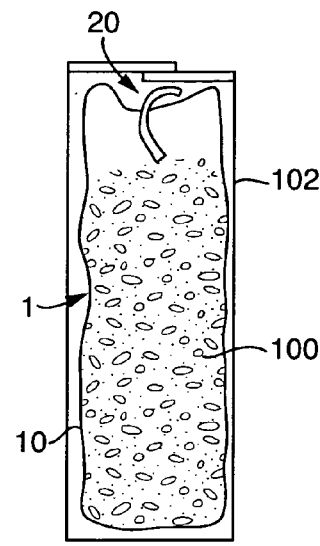
FIG. 5 is a sectional view of a box supporting a package according to the invention herein, with pourable product in the package.
Figure 7:
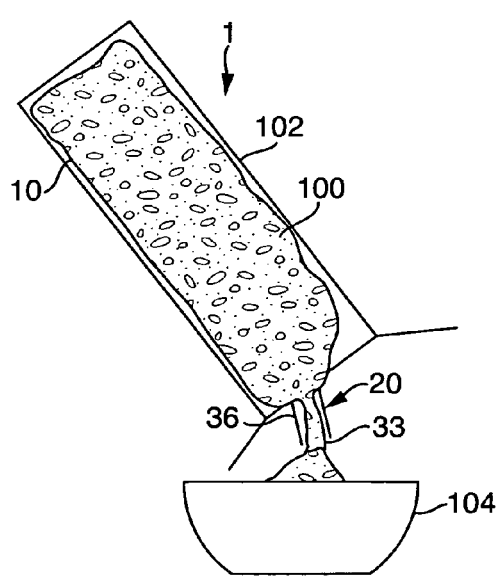
FIG. 7 shows the box, package of FIG. 5, with the product being poured.
Figure 6:
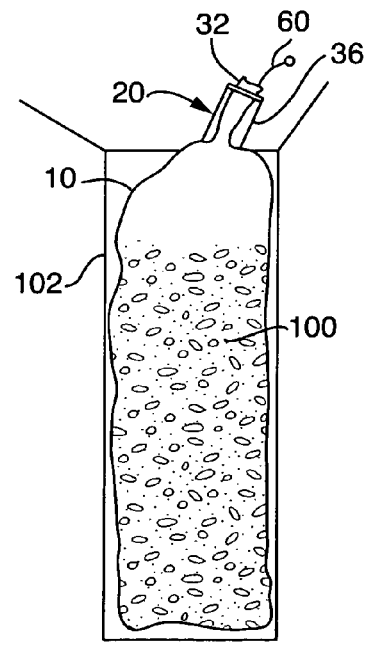
FIG. 6 is a view of the box, package and pourable product of FIG. 5, with the box open and the pouring spout of the package deployed for pouring the product.

With reference to FIGS. 5-7, use of the package 1 is illustrated. After forming seal 18 to mount the dispenser tube 20 but prior to forming end seal 16, a pourable product, in this case cereal 100, is placed between sheets 12 and 14. The end seal 16 is then formed, and the package 1 with the cereal therein is placed in a box 102 for support and protection. When it is desired to use the cereal 100, the box 102 is opened as shown in FIG. 6, and the end seam 39 is cut off from the sealing sleeve 36. The zipper seal 40 now maintains the package 1 in a closed condition.

When it is desired to dispense a serving of cereal 100, the zipper seal 40 is opened and the user reaches in, grasps and everts the pouring spout 32, as illustrated in FIG. 4. The box 102 is then turned upside down to pour the cereal through the everted pouring spout 32. This also provides for accurate placement of the cereal in a bowl 104.

After the serving of cereal is dispensed, the box 102 is returned to its upright condition, the pouring spout 32 is pushed into the bag 10 and the zipper seal 40 is engaged. This maintains the cereal in a sealed condition between uses, and keeps the cereal fresh and clean.

It will be appreciated that the package 1 has uses with many different products, examples of which are set forth above. For instance, the bag 1 may be sized to contain fertilizer, a portion of which may be dispensed through the everted pouring spout 32. The pouring spout 32 configuration is particularly useful for such a product, where it is necessary to direct the fertilizer into a spreader. Fertilizer notoriously attracts moisture and then forms clumps if left for a period of time in an open bag, and the package 1 of the invention protects the unused fertilizer from attracting moisture by means of the zipper seal. Other applications have similar benefits.

Accordingly, a package has been shown and described which admirably achieves the objects of the invention. It will be appreciated by those skilled in the art that various changes may be made without departing from the spirit and scope of the invention which is limited only by the following claims.

The invention claimed is:

1. A package for containing and dispensing of pourable product, the package comprising:
   a) a bag fabricated of sheet material and having at least one edge along which two sheets of the sheet material forming the bag are joined together by a seam;
   b) a dispenser tube in the form of a flattened flexible tube of material inserted through the seam of the bag with the two sheets of the bag respectively adhered to upper and lower layers of the flattened tube, wherein an interior pouring spout extends into the bag from the seam and an exterior sealing sleeve extends outwardly from the seam of the bag, and wherein the pouring spout is longer than the sealing sleeve;
   c) an openable/closeable seal extending across the exterior sealing sleeve of the dispenser tube adjacent the end thereof, the openable/closeable seal having first and second strips with releasably interengaging configuration;
   wherein the openable/closeable seal may be opened and the pouring spout everted through the sealing sleeve to extend past the openable/closeable seal.

2. A package as defined in claim 1, wherein the openable/closeable seal is a zipper seal with interengageable rib-and-groove configuration.

3. A package as defined in claim 2, wherein the package further comprises a box in which the bag and dispenser tube are contained prior to and after use in dispensing a pourable product.

4. A package as defined in claim 1, wherein the package further comprises a box in which the bag and dispenser tube are contained prior to and after use in dispensing a pourable product.

5. A package as defined in claim 1, wherein the bag and dispenser tube are fabricated of a thermoplastic polymer.

* * * * *